July 22, 1969     D. O SCHWENNESEN     3,456,535
LAMINATIONS WITHOUT SCRAP
Filed July 18, 1966
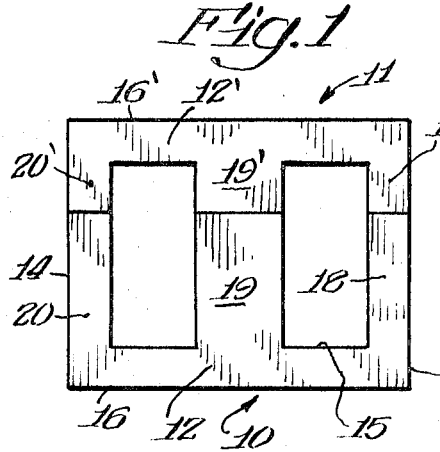
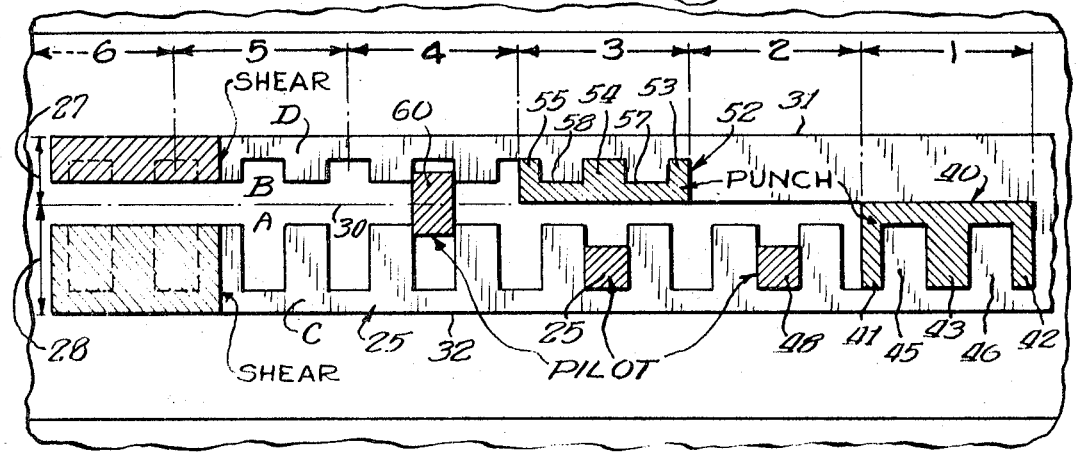
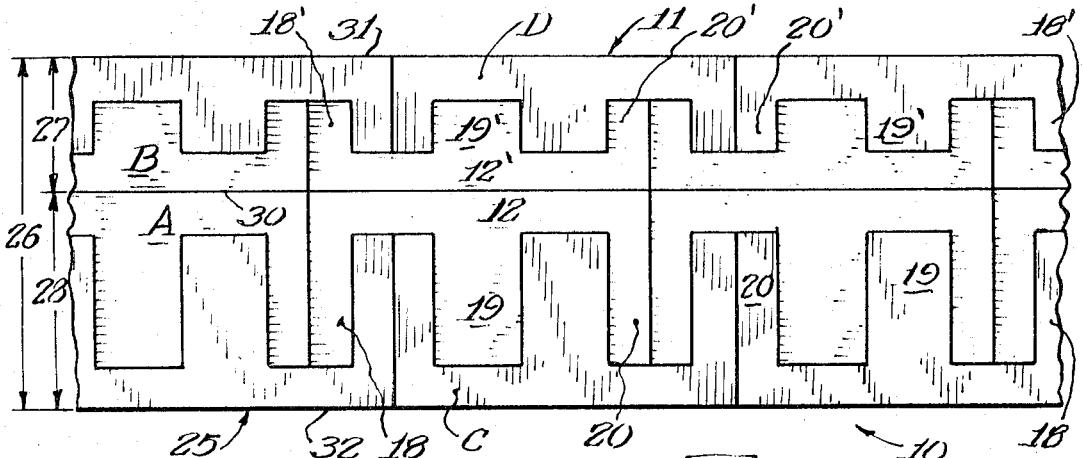
Inventor:
Donald O. Schwennesen
BY Robert L. Kahn ATTORNEY

United States Patent Office 3,456,535
Patented July 22, 1969

3,456,535
LAMINATIONS WITHOUT SCRAP
Donald O. Schwennesen, Crystal Lake, Ill., assignor to Allegheny Ludlum Steel Corporation, Brackenridge, Pa., a corporation of Pennsylvania
Filed July 18, 1966, Ser. No. 565,897
Int. Cl. B26d 7/60
U.S. Cl. 83—23                              4 Claims

ABSTRACT OF THE DISCLOSURE

Scrapless stamping of E laminations is provided by using a continuous strip of metal whose width just accommodates a stamping pattern having an outer row of large E's whose backs extend along one edge of such strip and an outer row of small E's whose backs are along the other edge of said strip, an additional inner row of large E's being interlocked with the outer row of large E's and an additional row of small E's being interlocked with the outer row of small E's, the procedure utilizing sides of windows created during stamping for piloting a strip through successive stamping stations for proper strip advance. The stamped E's are discharged so that a large and small E from the same transverse strip portion is paired to make a lamination layer, the remaining large and small E from the same transverse strip portion forming an adjacent lamination layer, additional lamination layers being successively provided from successive strip portions is used.

---

This invention relates to a method of stamping transformer core laminations for transformers from a continuous strip of metal. The invetnion is concerned with stamping E laminations from a strip of steel in such fashion that no scrap remains and the present invention constitutes an improvement upon my Patent No. 3,213,727 issued Oct. 26, 1965.

Transformer laminations are generally made of steels which are expensive so that any procedure for obtaining laminations from a continuous strip without scrap results in a substantial saving in money. In addition to the savings resulting from the elimination of scrap, a further advantage incident to the invention relates to uniformity of thickness of complementary E pieces of each lamination layer making transformer stacks. The complementary E pieces of a lamination layer in the present invention are large and small E-shaped punchings made from one long continuous strip of steel in roll form. In the manufacture of such steel strip, it is difficult to maintain accurately uniformity of thickness along the entire length of a roll. As a rule, there is no problem of uniformity of thickness transversely at any part of a strip.

The present invention provides stamping patterns which make it possible to collect complementary E pieces cut from the same transverse portion of strip stock. It is possible in the practice of the invention to collect complementary E pieces from transversely aligned portions of strip stock and matching piles of both large and small E pieces. Any variation of steel strip thickness along its length will be gradual.

As will be apparent later, the invention makes it easy to collect punchings in stacks or piles where complementary E pieces can have the same relationship insofar as relative stack position is concerned as obtained in the original strip stock. Thus E pieces cut from the same strip portion will be in complementary or adjacent relation in a stack, depending whether they are large or small E's.

The invention to be hereinafter disclosed is limited to laminations of the E type and because of geometrical considerations, involves certain dimensional relationships. For a complete explanation of the invention, reference will now be made to the drawings wherein FIG. 1 is a plan view of a core lamination layer of two different sized E laminations produced in accordance with this invention.

FIG. 2 is a plan view on the same scale as FIG. 1 of a strip of metal illustrating the E piece pattern for practicing the new method.

FIG. 3 is a plan view on a smaller scale of part of a continuous strip of metal illustrating one method of cutting E pieces.

FIG. 4 is a plan view on a smaller scale of a punch arrangement for practicing the preferred method embodying the invetnion.

Referring first to FIG. 1, a lamination layer consisting of two E pieces 10 and 11 is shown. Piece E consists of base 12 having its length between ends 13 and 14 and having front edge 15 and rear edge 16. Laterally extending from the front edge of base 12 are legs 18, 19 and 20 having equal lengths. End legs 18 and 20 are of equal width while center leg 19, which is disposed midway between the end legs, is twice the width of the end legs. The spacing between opposing sides of the end and center legs is equal to the width of center leg 19. The ends of the three legs of a piece extend along a straight line parallel to the length of base 12.

Cooperating E piece 11 is similar to 10 in all respects except that the length of the three legs is not necessarily equal to the length of the three legs of E piece 10. As a rule, the length of leg portions 18', 19' and 20' of E piece 11 may be equal to or less than the lengths of the corresponding legs of E piece 10. The ends of the three legs of E piece 11 also extend parallel to base 12' and when the two pieces are assembled together, the ends of the legs of pieces 10 and 11 abut with the rear edges of the bases 16 and 16' being in laterally offset parallel relationship. This lamination shape is the same as in my prior patent identified above.

It is preferred to have the lengths of the legs of E piece 11 less than the length of the legs in E piece 10. This permits alternate disposition of large E piece 10 and small E piece 11 on one side or the other side of a lamination layer so that rear edge 16 of a large E piece 10 in a finished stack will alternate with rear edge 16' of small E piece 11 along the stack height. This is the same as in my prior patent referred to above. For convenience in referring to the two E pieces 10 and 11, E piece 10 may be designated as the large E piece while E piece 11 may be designated as the small E piece.

In accordance with the present invention, it is possible to arrange a cutting pattern by assuming a theoretical arrangement of E pieces on a continuous strip of magnetic material, from which the individual E pieces are to be cut or stamped. Both large and small E pieces are produced from a continuous strip 25 of magnetic material. Since the invention relates to the cutting pattern from a magnetizable strip, it is unnecessary to specify the nature of the magnetic material used. As a rule, for transformers, the strip material may be of silicon steel or of other steels which may or may not be oriented in a particular direction. Strip 25 has a constant width 26 which is the sum of the following E dimensions—the lengths of the legs of pieces 10 and 11 plus twice the width of base 12 of E piece 10 plus twice the width of base 12' of E piece 11. In practice, bases 12 and 12' of the two E pieces will be the same so that the total width 26 of strip 25 will be the sum of four times the base width of an E piece (10 or 11) plus the combined length of a pair of opposed complementary legs such as, for example, 18 and 18'.

The total width 26 of strip 25 may, for purposes of analysis, be considered as consisting of two component strip portions 27 and 28 having a common imaginary straight dividing line 30 which is parallel to strip edges 31 and 32. The width of strip component portion 27 is two times the width of small E base portion 12' plus the length of a leg in said small E. Similarly the width of component strip portion 28 is twice the width of base portion 12 of large E piece 10 plus the length of a leg of the large E piece.

Each strip component portion 27 can accommodate an outer row of small E pieces where rear edge 16' of the small E's are along edge 31 of the strip. The inner row of the small E pieces has rear edge 16' along imaginary dividing line 30 of the strip. Strip component portion 28 also accommodates large E pieces 10 in exactly the same pattern. The outer row large E pieces 10 have their rear edges 16 of the base along strip edge 32 while the inner row of large E pieces 10 have their corresponding rear edges 16 of the base extending along imaginary dividing line 30.

The E piece pattern on strip 25 provides for two inner rows A and B of large and small E pieces back to back and two outer rows C and D of large and small E pieces along strip edges 31 and 32. The bases of all E pieces extend longitudinally of strip 25 while all E piece legs extend transversely of strip 25. The transverse arrangement of the E pieces is such that the legs of the adjacent inner rows A and B of E pieces 10 and 11 are aligned across strip 25. Similarly the legs of the E pieces in outer rows C and D will be aligned across strip 25.

It follows, therefore, that in component portion 27 of the strip, the pattern provides two interlocked small E pieces with the bases of the two pieces being spaced from each other and all the legs extending across the strip. Similarly, component portion 28 of strip 25 has the large E pieces 10 accommodating a similar pattern.

Cutting can be accomplished by stamping out all individual large E pieces in one row and all individual small E pieces in another row. It is understood that the cutting operation must be accomplished progressively so that a large E piece, for example, will be cut out at one punching station and a small E piece will be cut out at a different station. Such a punching procedure will leave two continuous rows of E pieces which will require cutting.

It is possible to stamp out separate E's along outer rows C and D of strip 25 and leave strip 33 shown in shaded outline in FIG. 3. In such case, it is necessary to arrange the punches and cooperating dies so that one E of the inner row (large or small as the case may be) can be sheared from the opposite E as well as from the main body of the E's after which the remaining row of E's can be sheared. Thus, specifically referring to FIG. 3, the feed of strip 25 for cutting or punching will be from right to left. The E pieces in outer rows C and D will first be punched out. It is understood that these E pieces in rows C and D may be punched out at one station or one E may be punched at one station and the other E may be punched at another station to avoid operating on too much of the metal at any one time. In any event, the shaded inner rows A and B will remain. Strip 33 having large and small E's in back to back relation can proceed to a punching station where a small E will be sheared off along lines 34 and 35. After the small E's in row B have been sheared along lines 34 and 35, only inner row A of large E's remains and individual E's can be severed or sheared at 36 to complete the entire cutting. The shearing of the small E's in row B along lines 34 and 35 will be accomplished at one station and the shearing of the large E's in row A along line 36 will be accomplished at a succeeding station. The cutting pattern described above in connection with FIG. 3 is not as desirable as the cutting pattern to be described in connection with FIG. 4 for the reason that the die arrangement is more expensive and elaborate.

Referring to FIG. 4, a progressive punch arrangement is illustrated. Station 1 has punch 40 having end leg forming portions 41 and 42 with double width center leg forming portion 43. Between leg forming portions 41 and 43 the metal of strip 25 is left in leg shapes 45 and 46. It is understood that punch 40 cooperates with a die portion for accurately cutting the large E piece corresponding to the shaded shape of punch 40.

Strip 25 is fed through the die from right to left as indicated by the arrow and it is understood that suitable guides through the die set for edges 31 and 32 of endless strip 25 are provided. Strip 25 is fed through intermittently with each step or lead through the die set being equal in length to the length of an E strip, this being indicated by station numbers. Strip 25 is fed forwardly to station 2. In this station, rectangular pilot portion 48 is provided for occupying the space of a substantial portion of the region cut out by punch portion 43. Pilot portion 48 may be secured either to the punch head or to the die portion below and cooperates with the metal edges transversely of strip 25 for controlling the feed of strip 25 for accurate positioning.

Strip 25 continues on so that the portion of the strip being operated upon is now at station 3. At this station, pilot portion 50 is provided to engage the same corresponding portion of the cut out region as pilot portion 48. It is understod, of course, that pilot portions 48 and 50 will be moved to clear strip 25 during travel from one station to a succeeding station. At station 3, small E die portion 52 is provided for punching out a small E along row B of the pattern of E's in portion 27 of strip 25. Punch 52 has cutting portions 53, 54 and 55 suitably dimensioned and shaped to cut or punch out a small E. Portions 57 and 58 between the leg cutting portions of punch 52 will leave metal from portion 27 of strip 25. Strip 25 continues on to station 4 where pilot portion 60 is provided. Pilot portion 60 is rectangular and extends on opposite sides of dividing line 30 of strip 25. Pilot portion 60 extends into the regions in rows A and B of strip 25 which had been previously punched out by punch portion 43 at station 1 and 54 at station 3.

After station 4, inner rows A and B of E pieces abutting dividing line 30 of strip 25 have been punched completely with all small and large E pieces in these rows removed and collected in conventional fashion. Means for guiding the inner edges of bottom row C of large E's, can be provided at station 4 to prevent the remaining metal from creeping toward dividing line 30. Similar guides can be provided at stations 4 and 5 for keeping outer row D of small E's spread for the purpose of maintaining the separation between the strip stock.

Shearing will occur at station 5 adjacent station 6 at an appropriate place for cutting outer rows C and D into E pieces, such cut pieces falling through suitable openings in station 6.

The cutting methods in connection with FIGS. 3 and 4 make it possible to handle the punchings, consisting of small and large E's, in such a fashion as to always maintain a large E and a small E originally in transverse alignment in the strip stock as a complementary pair of E pieces for a stack layer.

Thus specifically referring to FIG. 3, beginning with the left end thereof, transversely aligned large and small E's punched from outer rows C and D can be discharged from the press and fed by chutes to a stack so they make one complementary layer. The same guiding arrangement can be made for cuttings with the transversely aligned E pieces in rows A and B. This stacking can continue progressively as punching occurs along strip 25.

Referring to FIG. 2, it is possible to have transversely aligned punchings from rows A and B fed to one stack in such manner that the legs are aligned as in FIG. 1. Similarly the transversely aligned E pieces in rows C and D can also be guided by chutes from the punching stations to form a separate stack each layer of which will contain large and small E pieces which originally had been transversely aligned.

It is also possible to arrange the discharge chutes from all stations so that there will be only one stack of punchings. In such one stack, one layer may have tranversely aligned E's from rows C and D (with the E's brought together so that their legs abut) and the next layer will have the E's transversely aligned from rows A and B. It is necessary that the chutes be so arranged that the small and large E's are positioned so that their legs abut as in FIG. 1 and furthermore that the adjacent layers of complementary E's alternate so that along a stack (perpendicular to the plane of any lamination) a small E will alternate with a large E.

Thus in connection with FIG. 4, a large E punched at station 1 and a small E punched at station 3 (these will originally have been from metal transversely aligned across strip 25) can be so guided by discharge chutes that the two complementary legs will be in abutting relationship as illustrated, for example, in FIG. 1. The discharge chutes for station 6 in FIG. 4 can also be arranged to guide the complementary E punchings so that the E's abut as in FIG. 1. The chutes, however, must be arranged in such a one stack discharge arrangement so that one complementary pair of E pieces will be turned to obtain the alternate large and small E piece arrangement along the stack. This alternate arrangement of E pieces is disclosed in my prior patent referred to above and is a well-known expedient.

In the stacking arrangement just described where punchings from all four rows, A, B, C and D, are arranged to provide one stack or pile, it is evident that each layer of complementary E's will be of metal which originally had been transversely aligned in the strip stock. One adjacent layer will have metal from the same transverse piece of strip stock since there are four rows for punchings. The other adjacent layer will have complementary E's from strip stock which is longitudinally adjacent to the material of the preceding two layers referred to. In other words, where all punchings are guided by chutes to make one stack of core layers, each core layer having complementary E's, then one transverse piece of strip stock can provide the metal for two adjacent core layers after which the next two adjacent layers will form the portion of the strip stock following the first two adjacent layers.

In the situation, however, where two separate stacks are made from punchings, each stack consisting of layers of complementary E's (and having alternate large and small E's along the stack length) then in each stack, the following relationship will be present. Thus in a stack consisting of punchings from rows A and B for example, one layer will have complementary E's of metal which had originally been transversely aligned in the strip and the next layer will have complementary E's similarly aligned but from the adjacent longitudinal portion of strip 25.

In all cases, whether the punchings are collected in one stack or in two stacks, the complementary E's forming any layer will always be from metal which had been originally transversely aligned in the strip. Since any variation in strip thickness along the length of a strip is extremely small from one E length to another E length, it is immaterial whether the one or two separate stack arrangements are utilized. The important thing is that transversely aligned E's should be made from punching stations in such a fashion that such E's are paired together for a core layer. While this pairing of transversely aligned E's provides a substantial advantage, it is possible to utilize the punching pattern without regard to pairing transversely aligned E's. The importance of a transverse E alignment for each core layer is based upon the fact that complementary E's having the same thickness will reduce air gap variations between legs of the E's. If large E's have thicknesses different from the complementary small E's there will be air gap variations and will change the permeability characteristics of a transformer core. In certain alloys, such differences in permeability will result in significant transformer characteristic changes.

It is also possible to utilize a bundle of transformer punchings properly stacked by reference to stack height rather than number of stack layers. In the event that thickness does vary somewhat as strip material is used, the number of layers to a stack of predetermined height may vary by one or two layers. However, the uniformity of the product due to matched complementary E's is such that pre-formed windings can be assembled in a stack of laminations of predetermined height to utilize the space fully and still obtain precise predetermined characteristics.

What is claimed is:

1. In the art of making transformer laminations from a continuous strip of magnetizable material, wherein a complete lamination layer consists of large and small opposed complementary E's, each E having a base and legs extending laterally from the front edge of the base, each outer leg having a width equal to half the width of the center leg and being equally spaced therefrom, the legs of a large E being equal in length, the legs of a mating small E being equal in length, the bases of both E's being equal in width and length, a pair of complementary E's in a lamination layer being disposed with their legs extending toward each other in abutting relation and the bases being parallel with the rear of each base being on the outside of one lamination layer; said continuous strip of material having its width equal to two component widths, one component width being equal to twice the width of the base of one E plus the length of the leg thereof, the other component width being equal to twice the width of the base of the other complementary E plus the length of the leg thereof, the width of such strip being constant and an imaginary dividing line between such component widths being straight and extending longitudinally of the continuous strip parallel to the strip edges; there being on one side of such dividing line said one component strip portion accommodating a pattern having two rows of interlocked equal E's, the rows extending longitudinally of the strip and the E's of the outer row having their bases extending continuously along the strip edge and the bases of the E's in the inner row extending continuously along the dividing line and all the legs extending transversely of the strip; said other component strip portion accommodating a pattern having two rows of complementary equal E's arranged in the same manner as in the one component strip portion, the E pattern being such that the legs of the E's in the two outer rows extending along the outer edges of the entire magnetizable material strip extend toward each other in transverse alignment; the inner rows of E's having their legs aligned but extending away from each other, the method which includes the following steps:
    (a) stamping, from one large and one small E row on said strip, one large E and one small E, originally in transverse alignment on said strip, to leave E's in the remaining two rows attached to each other in succession along each of said remaining two rows,
    (b) piloting the strip metal through successive stamping stations by pilot members engaging opposed walls of windows created by removal of E stampings,
    (c) stamping E's from one remaining row,
    (d) stamping E's from the last remaining row,
    (e) controlling the discharge and stacking of stamped E's so that a small E and complementary large E, originally transversely aligned in the original strip are paired to make a lamination layer, there being a pair of adjacent lamination layers from one transverse piece of strip metal and successive pairs of lamination layers being from successive transverse pieces of strip metal whereby any part of a stack containing lamination layers will always be from one continuous length of original strip metal.

2. The method according to claim 1 wherein one large and one small E from the two inner rows are stamped to leave two outer rows of large and small E's respectively and thereafter shearing individual large and small E's from such strips and wherein piloting occurs at the opposed walls of at least one window created by the removal of at least one large E from the inner row and also at the opposed walls of a pair of transversely aligned leg openings in the inner rows of the large and small E's.

3. The method according to claim 2 wherein stamping of the large and small E's of the two inner rows occurs at two separate stations with an intervening station therebetween, and wherein piloting occurs in the large E windows of the inner row at said intervening station and at the adjacent station where the last inner row E is stamped, said piloting for both large and small E's occurring simultaneously at an additional station prior to the shearing of the outer row E's.

4. The method according to claim 1 wherein large and small E's are stamped from the outer rows only to leave a continuous strip containing inner rows of large and small E's and stamping E's from one inner row to leave a continuous strip of E's from the remaining inner row and thereafter shearing said last named continuous strip to provide E's therefrom.

References Cited
UNITED STATES PATENTS

| | | | |
|---|---|---|---|
| 509,770 | 11/1893 | Scott | 83—32 X |
| 1,962,432 | 6/1934 | Daley | 83—268 X |

ANDREW R. JUHASZ, Primary Examiner

U.S. Cl. X.R.

83—32, 268